US009375994B2

(12) United States Patent
Eisenhour et al.

(10) Patent No.: US 9,375,994 B2
(45) Date of Patent: Jun. 28, 2016

(54) VEHICLE ENGINE WARM-UP APPARATUS (71) Applicant: Nissan North America, Inc., Franklin, TN (US)

(72) Inventors: Ronald S. Eisenhour, West Bloomfield, MI (US); Richard Madden, Brighton, MI (US)

(73) Assignee: Nissan North America, Inc., Franklin, TN (US)

( * ) Notice: Subject to any disclaimer, the term of this patent is extended or adjusted under 35 U.S.C. 154(b) by 350 days.

(21) Appl. No.: 13/685,805

(22) Filed: Nov. 27, 2012

(65) Prior Publication Data

US 2014/0144997 A1    May 29, 2014

(51) Int. Cl.
*B60H 1/02* (2006.01)
*B60H 1/22* (2006.01)
*B60H 1/00* (2006.01)

(52) U.S. Cl.
CPC .......... *B60H 1/2218* (2013.01); *B60H 1/00314* (2013.01); *B60H 1/2221* (2013.01); *F01P 2025/12* (2013.01); *F01P 2025/30* (2013.01); *F01P 2037/02* (2013.01); *F01P 2060/08* (2013.01)

(58) Field of Classification Search
CPC .. B60H 1/034; B60H 1/00314; B60H 1/2218; B60H 1/2221; F01P 2060/08
See application file for complete search history.

(56) References Cited

U.S. PATENT DOCUMENTS

| | | | |
|---|---|---|---|
| 1,881,068 A | 10/1932 | Bates | |
| 2,789,794 A * | 4/1957 | Moore | B60H 1/00021 165/43 |
| 4,591,691 A * | 5/1986 | Badali | B60H 1/034 123/142.5 E |
| 4,914,924 A * | 4/1990 | Takahashi | B60H 1/00735 165/43 |
| 6,010,076 A * | 1/2000 | Winik | B60H 1/034 123/142.5 R |
| 6,037,567 A | 3/2000 | Inoue et al. | |
| 6,325,026 B1 * | 12/2001 | Suzuki | 123/41.1 |
| 6,779,737 B2 | 8/2004 | Murray et al. | |
| 8,140,246 B1 | 3/2012 | Manchanda | |
| 2001/0004090 A1 * | 6/2001 | Yamashita | B60H 1/00735 237/12 |
| 2001/0018832 A1 * | 9/2001 | Matsunaga | B60H 1/00485 62/239 |
| 2009/0283604 A1 * | 11/2009 | Martinchick et al. | 237/12.3 B |
| 2010/0230505 A1 * | 9/2010 | Ribadeneira et al. | 237/5 |

(Continued)

FOREIGN PATENT DOCUMENTS

DE    4433814 A1    3/1996
EP    2058269 A2    5/2009

(Continued)

*Primary Examiner* — Ljiljana Ciric
*Assistant Examiner* — Alexis Cox
(74) *Attorney, Agent, or Firm* — Global IP Counselors, LLP (57) ABSTRACT A vehicle engine warm-up apparatus includes a vehicle engine, a heating system, a coolant temperature sensor, a coolant heater and a controller. The vehicle engine has a coolant passage defined therein. The heating system provides heat to a passenger compartment of a vehicle using heat transferred from the vehicle engine to coolant flowing through the coolant passage. The coolant temperature sensor measures a temperature of the coolant flowing through the coolant passage. The coolant heater is configured to heat the coolant flowing through the coolant passage of the vehicle engine. The controller is configured to operate the coolant heater with the vehicle engine running to increase a rate of heating of the coolant to more rapidly make heat available to the heating system in response to determining that the coolant temperature is below a first temperature threshold.

9 Claims, 7 Drawing Sheets (56) References Cited

U.S. PATENT DOCUMENTS

2012/0145804 A1* 6/2012 Ishii .................. B60H 1/034
237/12.3 R
2013/0197749 A1 8/2013 Martini et al.

FOREIGN PATENT DOCUMENTS

| GB | 2326932 A | 1/1999 |
| WO | WO-02-34555 A1 | 5/2002 |

* cited by examiner

FIG. 8

VEHICLE ENGINE WARM-UP APPARATUS

FIELD OF THE INVENTION

The present invention generally relates to a warm-up apparatus for a vehicle engine. More specifically, the present invention relates to an apparatus for warming up a vehicle engine in order to more rapidly provide heat to the passenger compartment of the vehicle in cold weather conditions.

BACKGROUND INFORMATION

A vehicle typically includes an internal combustion engine with a heating system that provides heat to a passenger compartment of the vehicle. The heating system has a heat exchanger that is circulated with coolant from the internal combustion engine. The engine coolant must first be warmed by the internal combustion engine before heat can be provided to the passenger compartment. In cold weather conditions, it may take a considerable amount of time for the internal combustion engine to heat the coolant. Passengers within the vehicle must therefore wait until the internal combustion engine has at least partially warmed up before being provided with heat. Hence, passengers may have to wait an excessive amount of time to be provided with heat.

SUMMARY

In view of the state of the known technology, one object is to provide a vehicle engine with an apparatus that increases the rate at which the engine warms up in order to more rapidly provide heat to a passenger compartment.

In accordance with one aspect of the present invention, a vehicle engine warm-up apparatus includes a vehicle engine, a heating system, a coolant temperature sensor, a coolant heater and a controller. The heating system provides heat to a passenger compartment of a vehicle using heat transferred from the vehicle engine to coolant flowing through the coolant passage. The coolant temperature sensor is configured to measure a temperature of the coolant flowing through the coolant passage. The coolant heater is configured to heat the coolant flowing through the coolant passage of the vehicle engine. The controller is operably coupled to the coolant temperature sensor and the coolant heater. The controller is configured to operate the coolant heater with the vehicle engine running to increase a rate of heating of the coolant by the vehicle engine to more rapidly make heat available to the heating system in response to determining that the coolant temperature is below a first temperature threshold.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
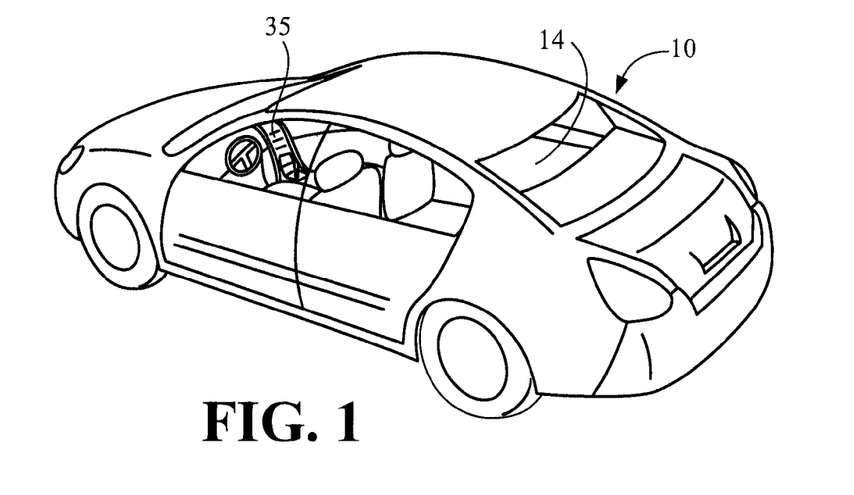
FIG. 1 is a perspective view of a vehicle that includes an engine, a heating system and a vehicle engine warm-up apparatus in accordance with the various embodiments.
Figure 2:
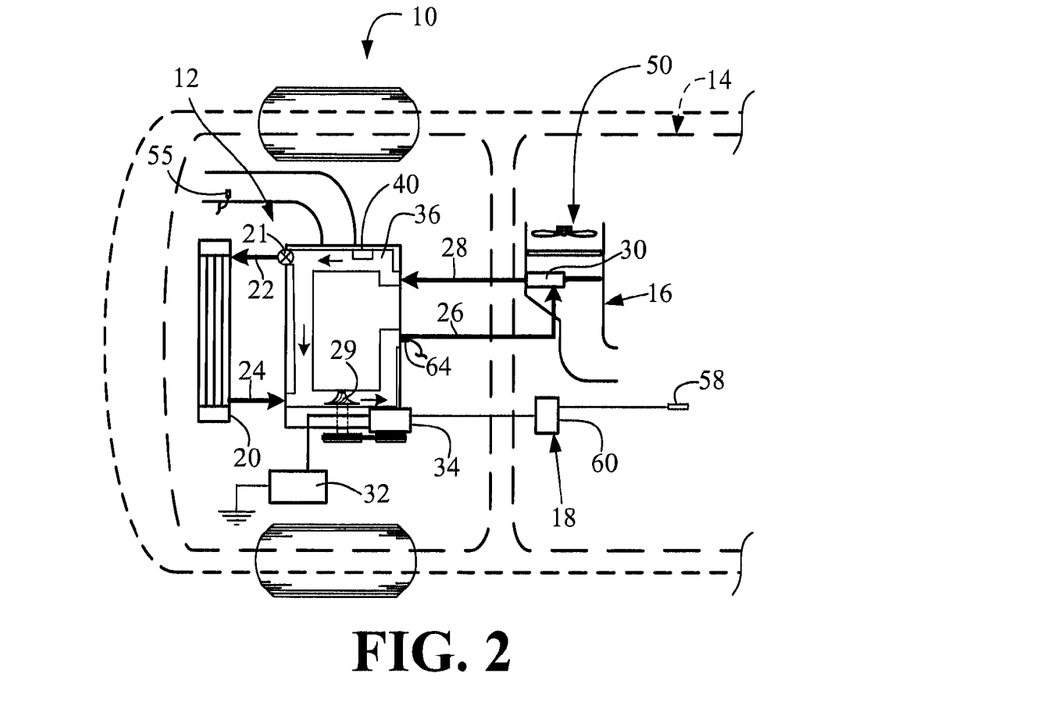
FIG. 2 is a schematic view of the engine, the heating system and the vehicle engine warm-up apparatus in accordance with the various embodiments.

Referring initially to FIGS. 1 and 2, a vehicle 10 is illustrated in accordance with a first embodiment. The vehicle 10 includes an engine 12, a passenger compartment 14, a heating system 16 and an engine warm-up apparatus 18. The vehicle 10 also includes a variety of additional features and components that are omitted from this description for the sake of brevity.

The engine warm-up apparatus 18 is described in greater detail below, after a description of invention related features of the engine 12, the passenger compartment 14 and the heating system 16.

The engine 12 is installed within an engine compartment of the vehicle 10, as shown in FIG. 2. The engine 12 can be any of a variety of hydrocarbon fueled engines, such as a gasoline powered internal combustion engine, a natural gas powered engine, or a diesel engine. Alternatively, the engine 12 can be a hybrid engine with the combination of an electric motor and a hydrocarbon fueled engine. The engine 12 includes, among other elements, a cooling system having a radiator 20 for dissipating excess heat, a thermostat 21, coolant hoses 22, 24, 26 and 28, a circulating pump 29 and a heater core 30 that is also a part of the heating system 16 of the vehicle 10. The engine 12 also includes a battery 32, an alternator 34 and a coolant passage 36 within the head of the engine 12.

The thermostat 21 is configured to limit and/or stop flow of refrigerant from the coolant passage 36 of the engine 12 to the radiator 20 when the coolant within the engine 12 is at or below operating temperature. In the depicted embodiment, with the engine 12 running, the circulating pump 29 continuously circulates coolant through the coolant passage 36 and the heater core 30. When an excess amount of heat has been generated by the engine 12, the thermostat 21 opens, such that the coolant can also circulate through the radiator 20 to dissipate the excess heat. Further, when the engine 12 and the coolant within the engine 12 is cold, the thermostat 21 closes limiting circulation of coolant to a closed loop between the engine and the heater core 30. In other words, when the engine 12 is cold, coolant does not flow through the radiator 20. The thermostat 21 is a conventional element with well known operations. Therefore, further description of the thermostat 21 and its operation is omitted for the sake of brevity.

As shown in FIG. 2, the coolant hoses 22 and 24 connect the radiator 20 with the engine 12 such that coolant can selectively circulate between the engine 12 and the radiator 20 when the thermostat 21 is opened. The coolant hoses 26 and 28 connect the heater core 30 to the engine 12 such that coolant can selectively circulate between the engine 12 and the heater core 30.

It should be understood from the drawings and the description herein that the engine 12 and/or heating system 16 can include a heater valve (not shown) that can control the flow of coolant circulating between the engine 12 and the heater core 30. However, such a heater valve is not required for practicing the invention, as is apparent from the description below.

The battery 32 is provided for starting the engine 12 and providing backup electric power to the vehicle 10, in a conventional manner. The battery 32 is supplied with electricity (for recharging) by the alternator 34. The alternator 34 is further configured to supply most if not all of the electric power necessary to run all electric powered equipment within the vehicle 10, when the engine 12 is running.

In FIG. 2, the coolant passage 36 has been simplified in order to better understand the invention. However, it should be understood from the drawings and the description herein that the coolant passage 36 can have a variety of flow ducts and channels such that the coolant within the coolant passage 36 can absorb heat from the engine 12 and deliver the heat to the heating system 16 or expel the heat to the radiator 20, as required in a conventional manner.

The coolant passage 36 is also provided with a coolant heater 40 that is part of the engine warm-up apparatus 18, as described in greater detail below.

The passenger compartment 14 includes many conventional elements, such as an instrument panel, seats and driving controls, whose description is omitted for the sake of brevity. The instrument panel includes a control panel 35 that is operated by a passenger within the vehicle 10 to control operation of the heating system 16, as is described in greater detail below.

The heating system 16 of the vehicle 10 includes an air handler 50. The air handler 50 is shown schematically in FIG. 3 along with an optional air conditioning evaporator 52, an air diverter door 54, a blower 56, a cabin air temperature sensor 58, the control panel 35 and the heater core 30. The heating system 16 is configured to provide heat to the passenger compartment 14 of the vehicle 12 using heat transferred from the engine 12 to the coolant circulating through the engine 12.

Figure 3:
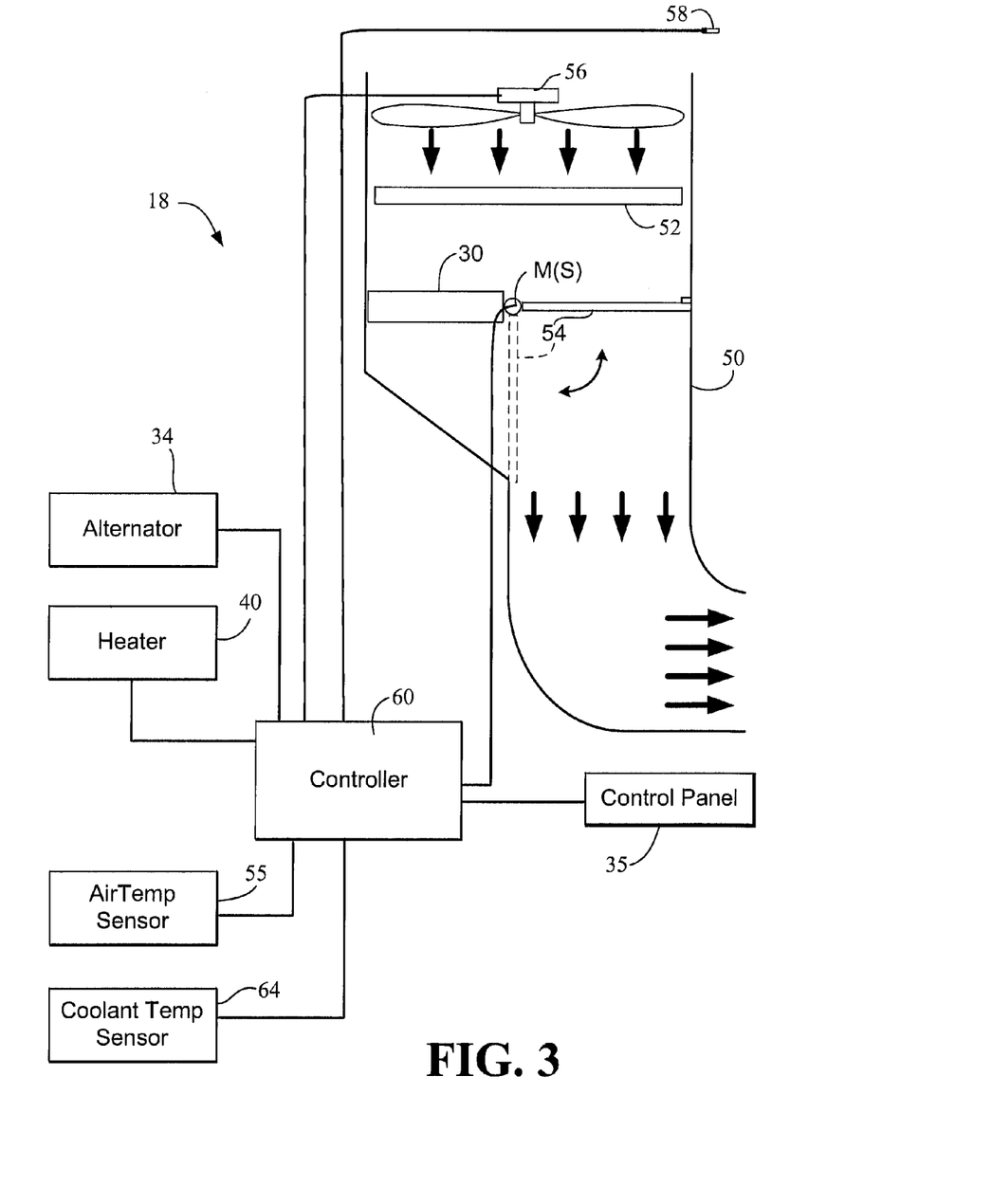
FIG. 3 is a schematic view of the heating system and the vehicle engine warm-up apparatus in accordance with the various embodiments.

The arrangement shown in FIG. 3 is a functional depiction that shows the various elements that are installed within the air handler 50. For example, the air conditioning evaporator 52, the air diverter door 54, the blower 56 and the heater core 30 are all disposed within the air handler 50. However, the relative positions of the various elements within the air handler 50 can be changed and/or re-arranged for the specific design of the vehicle 10, and are not limited to the schematic depiction in FIG. 3.

The air handler 50 is basically an air duct or a series of air ducts that directs air from outside the vehicle 12 (in a fresh air mode) and/or recirculates air from within the passenger compartment 14 (in a recirculation mode) back into the air handler 50 in a conventional manner. Since the basic operations of an air handler 50 are conventional, further description is omitted for the sake of brevity.

The air conditioning evaporator 52 is an optional feature of the air handler 50. Most vehicles include a conventional air conditioning (AC) system. However such an AC system is not required in all vehicles. Since air conditioning systems are conventional, further description of the air conditioning evaporator 52 is omitted for the sake of brevity.

The air diverter door 54 is a hinged member that is movable between a heat enabled position (shown in solid lines in FIG. 3) and a heat disabled position (shown in dashed lines in FIG. 3). More specifically, the air diverter door 54 is movable between the heat enabled position and the heat disabled position in order to control the amount of heat added to air flowing through the air handler 50. For example, when the air diverter door 54 is in the heat enabled position, all air passing through the air handler 50 passes along heat transferring surfaces of the heater core 30. If heat is available from coolant circulating through the heater core 30, the air flowing through the heater core 30 is heated. When the air diverter door is in the heat disabled position, the air passing through the air handler 50 is prevented from passing along heat transferring surfaces of the heater core 30.

In the depicted embodiment, the air diverter door 54 includes a motor M and a position sensor S. The motor M can be a vacuum controlled positioning device, or an electric motor. The sensor S provides feedback to a controller 60 (described further below) such that the controller 60 controls the position of the air diverter door 54. Both the motor M and the positioning sensor S are connected to the controller 60, as is described in greater detail below. Alternatively, the motor M can be replaced with a conventional cable connected to the air diverter door 54. The cable (not shown) is also connected to a control mechanism included in the control panel 35. When the control mechanism, such as a lever, is manipulated by the passenger, the amount of air flowing across heat transfer surfaces of the heater core 30 is adjusted in a conventional manner. The positioning sensor S can be included in the embodiment with the cable in order to sense the position of the air diverter door 54.

The blower 56 is provided to force air through the air handler 50. A speed of the blower 56 is controlled by the settings on the control panel 35 within the passenger compartment 14. Since the blower 56 is a conventional element, further description is omitted for the sake of brevity.

The cabin air temperature sensor 58 is positioned within the passenger compartment 14 and is connected to the controller 60. The function of the cabin air temperature sensor 58 is described further herein below.

The control panel 35 includes control elements that allow the passenger within the passenger compartment 14 to control operation of the heating system 16 and the AC system. The control panel 35 is connected to the controller 60, and is manipulated by the passenger(s) to control operation of AC system, the air diverter door 54 and the blower 56.

A description of the engine warm-up apparatus 18 is now provided with specific reference to FIG. 3. The engine warm-up apparatus 18 basically includes the coolant heater 40, an ambient air temperature sensor 55, the cabin air temperature sensor 58, the controller 60 and a coolant temperature sensor 64. The coolant heater 40, the ambient air temperature sensor 55, the cabin air temperature sensor 58 and the coolant temperature sensor 64 are all connected to the controller 60.

The ambient air temperature sensor 55 is positioned on the vehicle 10 to measure the temperature of ambient air outside the passenger compartment 14. In FIG. 2, the ambient air temperature sensor 55 is positioned on or within an air inlet of the engine 12. However, the ambient air temperature sensor 55 can be installed at any of variety of locations around the vehicle 10.

The coolant temperature sensor 64 can be located in any of a variety of locations. The coolant temperature sensor 64 can be on or within the engine 12 to measure the temperature of the coolant circulating through the engine 12. For example, the coolant temperatures sensor 64 can be installed within the coolant passage 36, as long as the coolant temperature sensor 64 is spaced apart from the coolant heater 40. Alternatively, the coolant temperature sensor 64 can be located within the heater core 30 or one of the coolant hoses 26 and 28, as shown in FIG. 2. With respect to the invention, the coolant temperature sensor 64 measures a coolant temperature $T_C$ of the coolant that provides heat to the heater core 30 and hence provides heat to the passenger compartment 14, once heat from the engine 12 is available. The coolant temperature sensor 64 is connected to the controller 60 and provides signals that represent the temperature of the coolant circulating through the engine 12 and heater core 30.

The ambient air temperature sensor 55 is configured to measure a temperature $T_A$ that is indicative of the temperature of air outside the passenger compartment 14 but within the vicinity of the vehicle 10. In FIG. 2, the ambient air temperature sensor 55 is depicted as measuring the temperature of combustion air entering the engine 12.

The coolant heater 40 is configured to heat the coolant within the coolant passage 36 of the engine 12. In the depicted embodiment, the coolant heater 40 extends into the coolant passage 36 or is installed within the coolant passage 36. However, the coolant heater 40 can also be mounted to the block of the engine 12 or to the head of the engine 12 such that the coolant heater 40 further provides heat to a portion of the engine 12 along the coolant passage 36. The location of the coolant heater 40 is ideally at the coolant flow entrance to the head of the engine 12, where combustion occurs. For example, the coolant heater 40 is positioned within or on the engine 12 such that associated coolant temperature increases that occur due to the operation of the coolant heater 40 are further intensified when the coolant is exposed to the very high combustion/exhaust temperatures produced by operation of the engine 12. The resulting head-exit coolant temperature is significantly increased and made available to the heater core 30.

The coolant heater 40 is, for example, an electric heater that draws most if not all of its electricity from the alternator 34, not the battery 32. More specifically, the coolant heater 40 is operated by the controller 60 only when the engine 12 is running and the alternator 34 is producing electric current. The controller 60 does not operate the coolant heater 40 when the controller 60 detects that the engine 12 is not running.

In a first embodiment, the controller 60 is operably coupled to at least the ambient air temperature sensor 55, the coolant temperature sensor 64, and the coolant heater 40 to operate the coolant heater 40 with the vehicle engine running to increase a rate of heating of the coolant by the engine 12. The rate of coolant heating is increased in order to more rapidly make heat available to the heating system 16. The controller 60 operates the coolant heater 40 is in response to determining that the ambient air temperature $T_A$ is not above a first temperature threshold $T_1$. The controller 60 operates the coolant heater 40 in response to determining that the coolant temperature $T_C$ is below a second temperature threshold $T_2$. The controller 60 is further configured to cease operation of the coolant heater 40 in response to determining the ambient air temperature $T_A$ is above the first temperature threshold $T_1$. The controller 60 is further configured to cease operation of the coolant heater 40 in response to determining that and the coolant temperatures $T_C$ is above an upper threshold $T_U$. The controller 60 is further configured to cease operation of the coolant heater 40 in response to determining the coolant temperature $T_C$ is not below the second temperature threshold $T_2$. The first temperature threshold $T_1$, the second temperature threshold $T_2$ and the upper threshold $T_U$ are predetermined and are saved values within memory of the controller 60.

The controller 60 is also connected to the alternator 34 to detect whether or not the alternator 34 is generating electric current. More specifically, the controller 60 is configured to detect whether or not the engine 60 is running. In the depicted embodiments, the coolant heater 40 can only be operated when the engine 12 is running and the alternator 34 is providing electricity to power the coolant heater 40.

In circumstances where the vehicle 10 is exposed to cold weather conditions, the temperature of the engine 12 can get correspondingly low along with the coolant within the engine 12 and the heating system 16. When the engine 12 is started in cold weather conditions, the engine 12 can take a considerable amount of time to reach operating temperatures (for example, somewhere between about 150° F. and 200° F., or 66° C. and 93° C.). In conditions where the ambient temperature is below 10° C., a small fuel efficient engine can take anywhere from, for example, 10 minutes to 15 minutes to reach operating temperatures (the actual time differs from engine to engine). In most vehicles, heat is not available to the heating system 16 until the engine 12 has approached or achieved the operation temperature. Therefore, passengers within the passenger compartment 14 are without heat for a considerable amount of time.

By heating the coolant within the engine 12, the engine 12 more rapidly reaches operation temperature and more rapidly produces heat that can be used to heat the passenger compartment 14. An additional benefit is that, since the engine 12 reaches operating temperatures more rapidly, the engine 12 is able to realize fuel efficient operation more quickly, since a fully warmed up engine typically operates with greater fuel efficiency than a cold engine or an engine that has not yet reached operating temperatures. Also, rapid warm-up of an engine improves the exhaust emission conditions.

Figure 4:
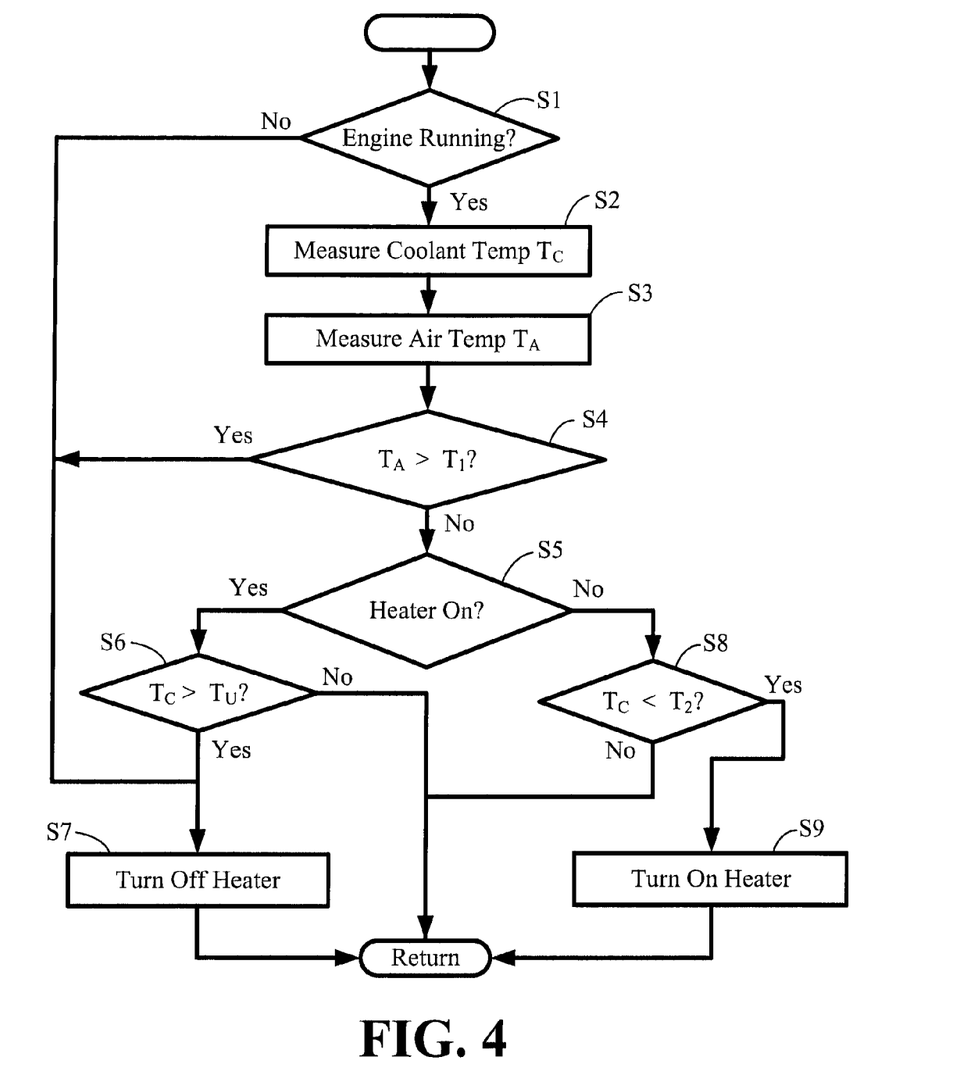
FIG. 4 is a flowchart showing steps of operation of the vehicle engine warm-up apparatus in accordance with a first embodiment.

A first embodiment is described now with specific reference to FIG. 4.

In the flowchart depicted in FIG. 4, step S1 represents the controller 60 checking to see whether or not the engine 12 is running, and optionally, running smoothly. Step S1 can be accomplished in any of a variety of manners. For example, the controller 60 can be connected to the alternator 34 and can detect that the engine 12 is running by determining whether or not the alternator 34 is producing electric current. It should also be understood from the description and drawings herein, that the controller 60 can also be connected to ignition circuitry (not shown) of the engine 12 in order to determine whether or not the engine 12 is running and whether or not the engine 12 is running smoothly. For example, the engine speed (RPMs) can be detected by the controller 60 to determine if the engine is running.

The engine warm-up apparatus 18 was conceived to more rapidly warm-up the engine 12 in order to provide heat to the passenger compartment 14 more quickly. Therefore, in the depicted embodiment, the controller 60 only engages the coolant heater 40 in response to determining that the engine 12 has been started and is idling or running smoothly. The vehicle 10 includes other elements and features (not shown) that effect the starting and smooth running of the engine 12.

In step S1, if the engine is running (and running smoothly) then operation moves to step S2. If the engine is not running (or is not running smoothly) then operation moves to step S7 (described below). At step S2, the controller 60 checks the signals received from the coolant temperature sensor 64 in order to determine the coolant temperature $T_C$. Next, at step S3, the controller 60 checks the signals received from the ambient air temperature sensor 55 in order to determine the ambient air temperature $T_A$. Next, at step S4, a comparison is made by the controller 60. Specifically, the controller 60 determines whether or not the ambient air temperature $T_A$ is greater than the first temperature threshold $T_1$. If $T_A$ is greater than $T_1$ then operation moves again to step S7 (described below). If $T_A$ is greater than $T_1$ it means that, with the engine 12 running, the ambient temperature $T_A$ is high enough for the engine 12 to warm up quickly and the coolant does not need to be heated or little advantage is gained by heating the coolant given the measured air temperature.

The first temperature threshold $T_1$ is not a fixed value for all vehicles. The first temperature threshold $T_1$ is predetermined on a vehicle-by-vehicle basis. In the depicted embodiment, the first temperature threshold $T_1$ is set and stored in memory as being about 10° C.

At step S4, if $T_A$ is not greater than $T_1$ then operation moves to step S5. At step S5, the controller 60 determines whether or not the coolant heater 40 is on and is heating the coolant circulating through the coolant passage 36. At step S5, if coolant heater 40 is on, operation moves to step S6. If coolant heater 40 is not on, operation moves to step S8 (described below).

At step S6, another comparison is made by the controller 60. Specifically, the controller 60 determines whether or not the coolant temperature $T_C$ is greater than the upper threshold $T_U$.

The upper threshold $T_U$ is another variable that is predetermined on a vehicle-by-vehicle basis or engine-by-engine basis. The upper threshold $T_U$ is typically a value that is less than or equal to the operating temperature of the engine 12. In the depicted embodiment, the upper threshold $T_U$ is equal to 85° C. If $T_C$ is greater than $T_U$ it means that the engine 12 coolant is heated sufficiently to provide heat to the heater core 30 and hence provide adequate heat to the passenger compartment 14.

At step S6, if $T_C$ is greater than $T_U$ then operation moves to step S7 where the coolant heater 40 is dis-engaged or turned off. At step S6, if $T_C$ is not greater than $T_U$ then operation returns to the beginning of the flowchart and repeats the operations set forth in FIG. 4. After step S7, operations return to the beginning of the flowchart and the steps repeat.

Attention now returns to the negative decision made at step S5, where operation moves to step S8. At step S8, another comparison is made by the controller 60. Specifically, the controller 60 determines whether or not the coolant temperature $T_C$ is less than the second temperature threshold $T_2$.

The second temperature threshold $T_2$ is a value that can be equal to the upper threshold $T_U$ but is preferably less that the upper threshold T. In the depicted embodiment, the second temperature threshold $T_2$ is equal to, for example, 10° C. If the coolant temperature $T_C$ is close to the operating temperature of the engine 12, then there may be little advantage to engaging the coolant heater 40. However, if the coolant temperature $T_C$ is well below the operating temperature of the engine 12, then there may be an advantage to engaging the coolant heater 40.

Therefore, at step S8, if the controller 60 determines that the coolant temperature $T_C$ is less than the second temperature threshold $T_2$, operation moves to step S9. At step S9, the coolant heater 40 is turned on, thereby heating the coolant within the coolant passage 36. At step S8, if the controller 60 determines that the coolant temperature $T_C$ is not less than the second temperature threshold $T_2$, operation returns to the beginning of the flowchart and repeats.

Hence, in the steps set forth in the flowchart of FIG. 4, there is a method for warming-up a vehicle engine. The method includes measuring temperature of combustion air entering the engine 12 and measuring temperature of coolant within a cooling system of the engine 12 and determining the relationships between these measured temperatures and predetermined values. If these temperatures fall within the predetermined values, the coolant heater 40 can be operated. Thereafter, the coolant heater 40, with the vehicle engine running, generates heat to increase the overall rate at which the coolant within the engine 12 increases in temperature in order to more rapidly make heat available to the heating system 16 of the passenger compartment 14. The coolant heater 40 is operated only in response to determining that the air temperature is below a first temperature threshold $T_1$ and the coolant temperature $T_C$ is below the second temperature threshold $T_2$.

The method shown in FIG. 4 further includes ceasing operation of the coolant heater 40 in response to determining that the coolant temperature $T_C$ is above the upper threshold $T_U$. The method shown in FIG. 4 further includes ceasing operation of the coolant heater 40 in response to determining that the ambient air temperature $T_A$ is not below the second temperature threshold $T_2$.

Second Embodiment

Figure 5:
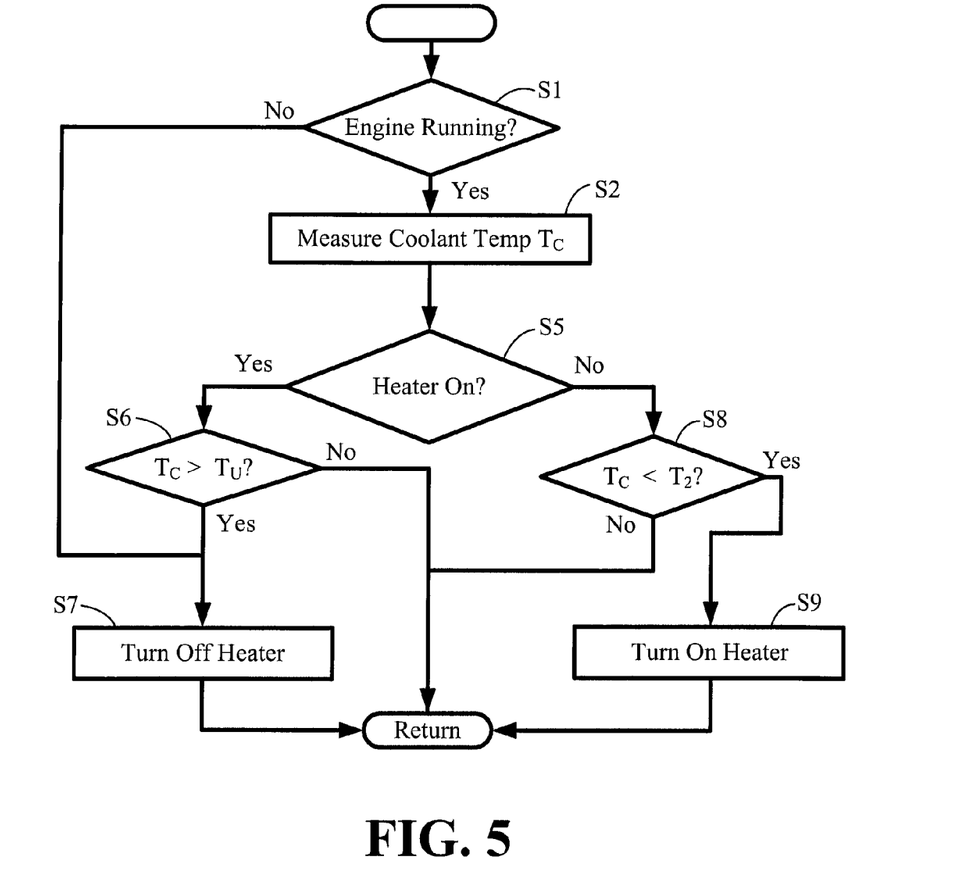
FIG. 5 is a flowchart showing steps of operation of the vehicle engine warm-up apparatus in accordance with a second embodiment.

Referring now to FIG. 5, a flowchart showing steps of operating the engine warm-up apparatus 18 in accordance with a second embodiment will now be explained. In view of the similarity between the first and second embodiments, the operation (steps) of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The engine warm-up apparatus 18 of the second embodiment employs simplified logic and fewer components, as compared to the first embodiment. Specifically, the second embodiment depicted in the flowchart in FIG. 5 includes fewer steps than the steps S1 through S9 as described above in the first embodiment. Further, in the second embodiment, the ambient air temperature $T_A$ is not employed. Rather, the logic depicted in FIG. 5 relies mainly on the temperature $T_C$ of the coolant within the engine 12 and cooling system 18.

In the second embodiment, as shown in FIG. 5, steps S1 and S2 are the same as explained above with respect to FIG. 4. Specifically, at step S1, the controller 60 determines whether or not the engine 12 is running and running smoothly. At step S2, the temperature $T_C$ of the coolant is measured. Operation then moves from step S2 directly to step S5, with steps S3 and S4 of the first embodiment being omitted.

Steps S5-S9 are the same as described above with respect to FIG. 4 and the first embodiment. Hence, in the second embodiment, the coolant heater 40 is controlled primarily based upon the temperature measurements of the coolant within the engine 12 made by the coolant temperatures sensor 64.

Third Embodiment

Figure 6:
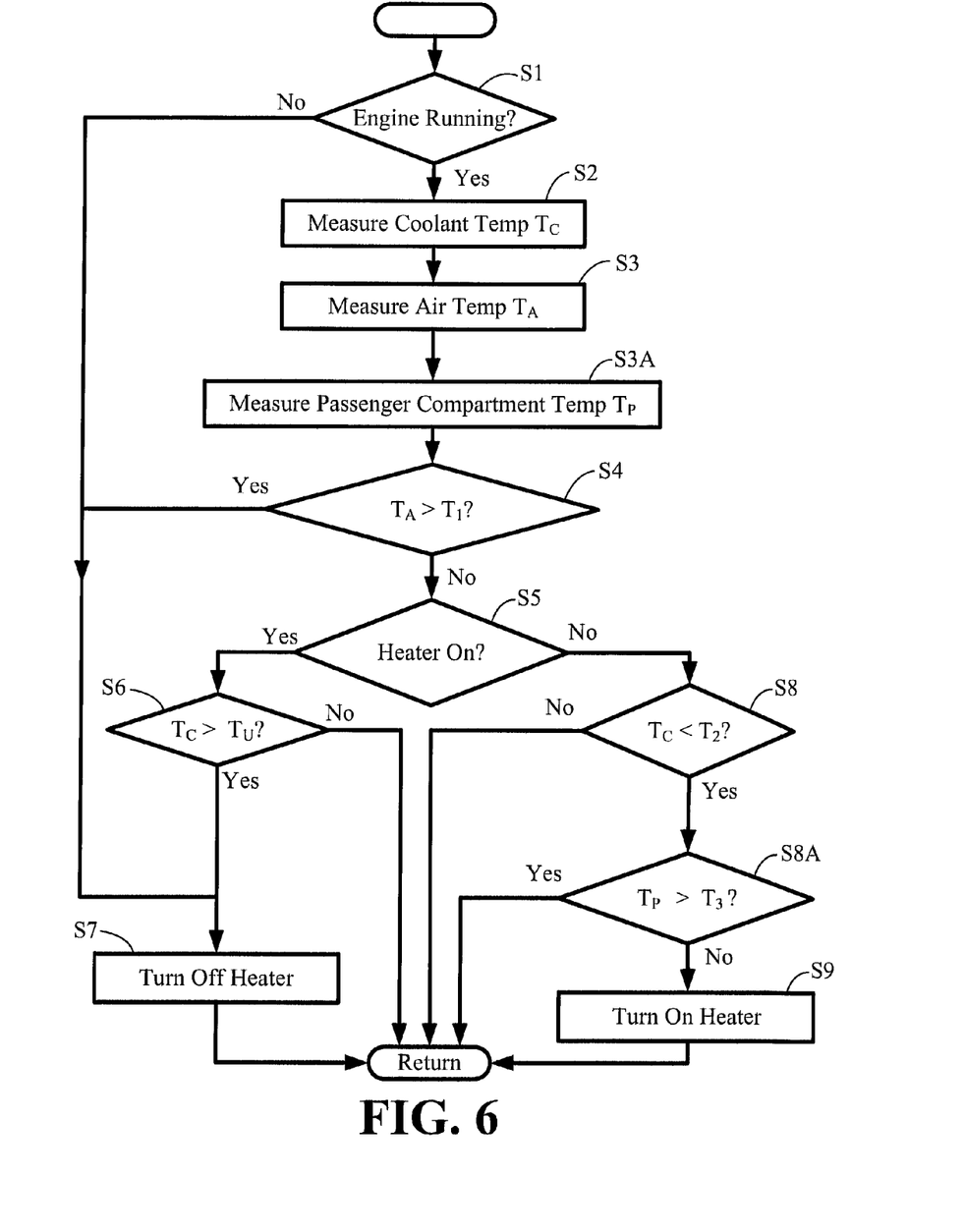
FIG. 6 is a flowchart showing steps of operation of the vehicle engine warm-up apparatus in accordance with a third embodiment

Referring now to FIG. 6, a flowchart showing steps of operating the engine warm-up apparatus 18 in accordance with a third embodiment will now be explained. In view of the similarity between the first and third embodiments, the operation (steps) of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The third embodiment depicted in the flowchart in FIG. 6 includes all of the steps S1 through S9 as described above in the first embodiment and all of the elements described and shown in FIGS. 2 and 3. However, in the third embodiment, two additional steps have been added, steps S3A and SBA. Specifically, after step S3, a new step S3A has been added in which a passenger compartment temperature $T_P$ is measured by the cabin air temperature sensor 58. In FIG. 2, the cabin air temperature sensor 58 is shown within the passenger compartment 14 adjacent to the air handler 50. However, it should be understood that the cabin air temperature sensor 58 can be located at a variety of locations within the passenger compartment 14 or the air handler 50.

The usefulness of the cabin air temperature sensor 58 is apparent when one considers the following circumstances. Specifically, if the vehicle 10 has been left out in cold weather conditions, but is also left out in the sun, the passenger compartment 14 may be well heated by the sun. If the passenger compartment 14 is above a predetermined third threshold temperature $T_3$, it may not be necessary to increase the rate at which the engine 12 warms up.

Therefore, at step S3A, the controller 60 determines the passenger compartment temperature $T_P$ based upon signals received from the cabin air temperature sensor 58. The controller 60 then moves operation to step S4 (described above with respect to FIG. 4).

In the third embodiment, after step S8, operation moves to a new step S8A, where another comparison is made. Specifically, in step S8A, the controller 60 determines whether or not the passenger compartment temperature $T_P$ is greater than the third temperature threshold $T_3$. The third temperature threshold $T_3$ is a value based upon passenger comfort and in the depicted embodiment is equal to about 20° C. It is assumed that the temperature within the passenger compartment 14 will begin to drop once the vehicle 10 is in motion and before the heating system 16 is able to provide heat to the passenger compartment 14. Therefore, the third temperature threshold $T_3$ is set to the above mentioned value and stored in the memory of the controller 60.

At step S8A, if $T_P$ is greater than $T_3$, then operation returns to the beginning of the flowchart depicted in FIG. 6. If $T_P$ is not greater than $T_3$, then operation moves to step S9, where the coolant heater 40 is turned on.

Other than the addition of step S3A and step S8A, the steps S1 through S9 are the same as described above, except that after step S3 operation moves to step S3A, and after a positive determination in step S8, operation moves to the new step S8A.

Fourth Embodiment

Figure 7:
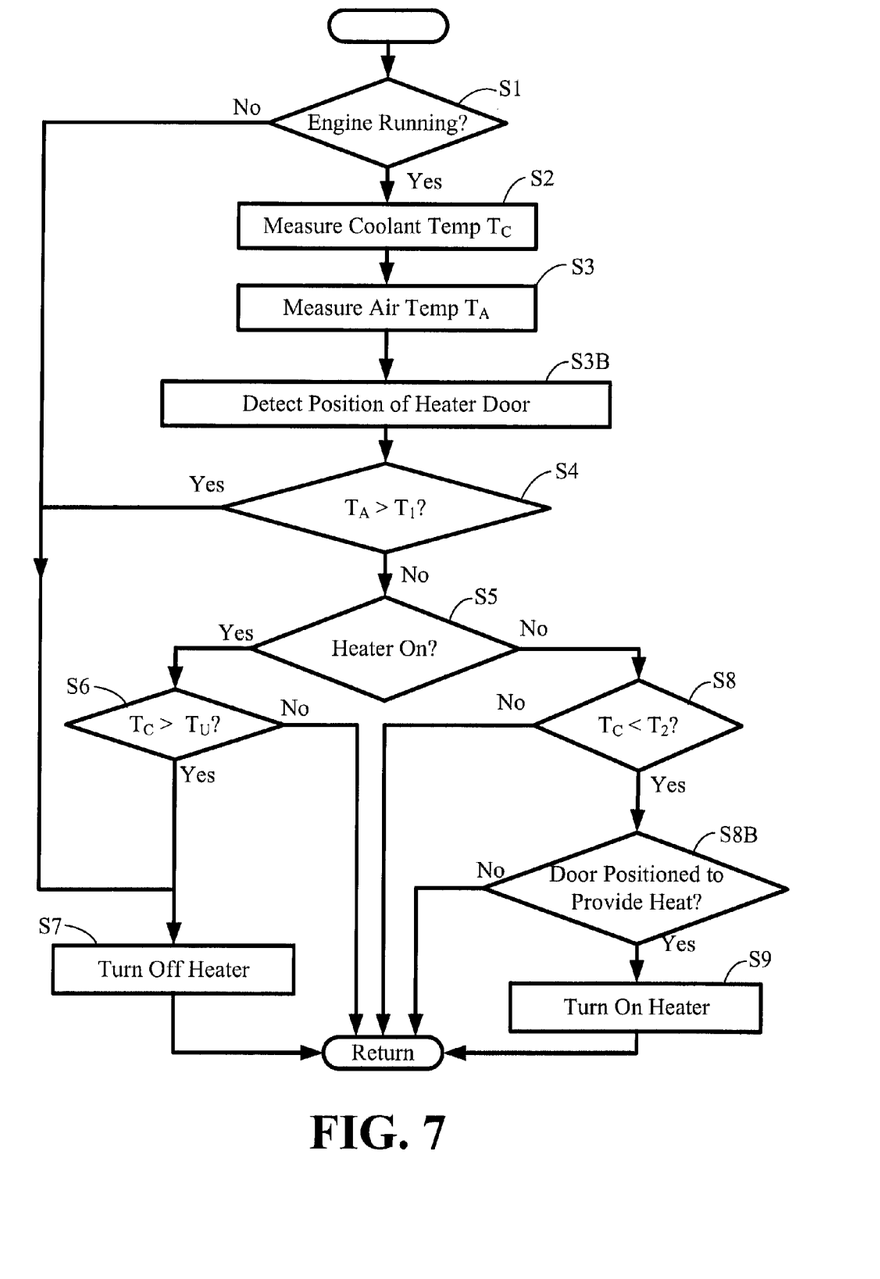
FIG. 7 is a flowchart showing steps of operation of the vehicle engine warm-up apparatus in accordance with a fourth embodiment.

Referring now to FIG. 7, a flowchart showing steps of operating the engine warm-up apparatus 18 in accordance with a fourth embodiment will now be explained. In view of the similarity between the first and fourth embodiments, the operation (steps) of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The fourth embodiment depicted in the flowchart in FIG. 7 includes all of the steps S1 through S9 as described above in the first embodiment and all of the elements described and shown in FIGS. 2 and 3. However, in the fourth embodiment, two additional steps have been added, steps S3B and S8B. Specifically, after step S3, a new step S3B has been added in which the position of the air diverter door 54 (aka heater door) is sensed by the sensor S. The position of the air diverter door 54 demonstrates the status of the heating system 16. Specifically, if the air diverter door 54 is in the heat enabled position then the controller 60 determines that heat is being requested by the passenger(s) within the vehicle 10. If the air diverter door 54 is in the heat disabled position, then the controller 60 determines that heat is not being requested by the passenger(s) within the vehicle 10.

Therefore, at step S3B, the controller 60 determines the position of the air diverter door 54 based upon signals from the sensor S and consequently, determines the status of the heating system. The controller 60 then moves operation to step S4 (described above with respect to FIG. 4).

In the fourth embodiment, after step S8, operation moves to a new step S8B, where another comparison is made. Specifically, in step S8B, the controller 60 determines whether or not the passenger(s) have requested heat, based upon the position of the air diverter door 54. The position of the air diverter door 54 corresponding to requested heat determination can be, for example, a range of positions and is not limited to the full heat position depicted in solid lines in FIG. 3.

At step S8B, if heat has not been requested, then operation returns to the beginning of the flowchart depicted in FIG. 7. If heat has been requested at step S8B, then operation moves to step S9, where the coolant heater 40 is turned on.

Other than the addition of step S3B and step S8B, the steps S1 through S9 are the same as described above, except that after step S3 operation moves to step S3B, and after a positive determination in step S8, operation moves to the new step S8B.

Fifth Embodiment

Figure 8:
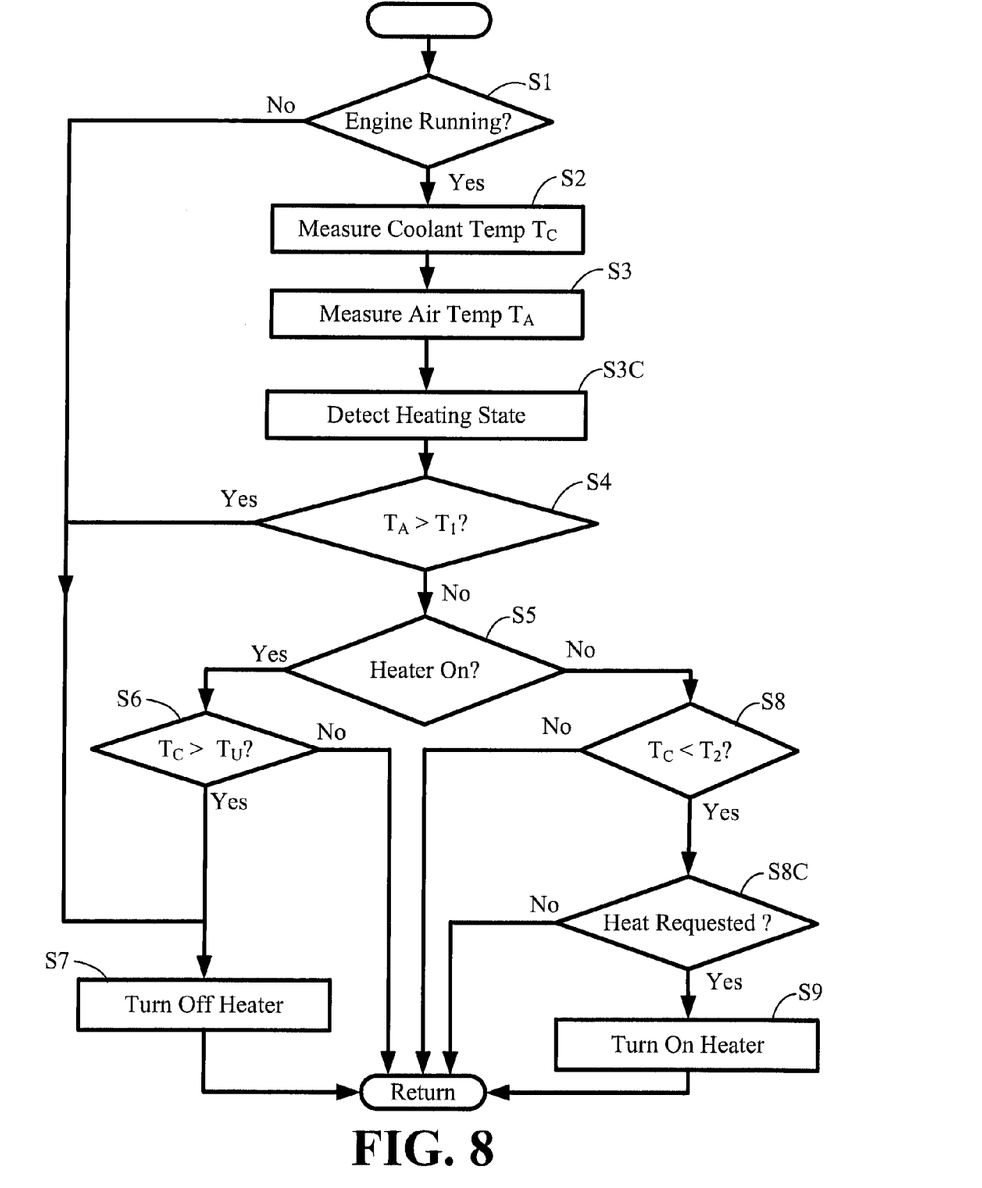
FIG. 8 is a flowchart showing steps of operation of the vehicle engine warm-up apparatus in accordance with a fifth embodiment.

Referring now to FIG. 8, a flowchart showing steps of operating the engine warm-up apparatus 18 in accordance with a fifth embodiment will now be explained. In view of the similarity between the first and fifth embodiments, the operation (steps) of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The fifth embodiment depicted in the flowchart in FIG. 8 includes all of the steps S1 through S9 as described above in the first embodiment and all of the elements described and shown in FIGS. 2 and 3. However, in the fifth embodiment, two additional steps have been added, steps S3C and S8C. Specifically, after step S3, a new step S3C has been added in which the status of the control panel 35 is detected by the controller 60. Specifically, if the settings on the control panel 35 are such that heat is being requested, such settings demonstrate the status of the heating system 16.

Therefore, at step S3C, the controller 60 determines the status of the heating system based upon signals from the control panel 35 that provide an indication of the settings of the control panel 35 made by vehicle occupants. The controller 60 then moves operation to step S4 (described above with respect to FIG. 4).

In the fifth embodiment, after step S8, operation moves to a new step S8C, where another comparison is made. Specifically, in step S8C, the controller 60 determines whether or not the passenger(s) have requested heat, based upon the settings of the control panel 35 within the passenger compartment 14.

At step S8C, if heat has not been requested, then operation returns to the beginning of the flowchart depicted in FIG. 8. If heat has been requested at step S8C, then operation moves to step S9, where the coolant heater 40 is turned on.

Other than the addition of step S3C and step S8C, the steps S1 through S9 are the same as described above, except that after step S3 operation moves to step S3C, and after a positive determination in step S8, operation moves to the new step S8C.

The controller 60 preferably includes a microcomputer (having a central processing unit or CPU) with an engine warm-up control program that controls the engine warm-up apparatus 18. The controller 60 can also include other conventional components such as an input interface circuit, an output interface circuit, and storage devices such as a ROM (Read Only Memory) device and a RAM (Random Access Memory) device. The microcomputer of the controller 60 is programmed to control the engine warm-up apparatus 18. The memory circuit stores processing results and control programs such as ones for operation of the engine warm-up apparatus 18 that are run by the processor circuit. The controller 60 is operatively coupled to the various components and elements of the engine warm-up apparatus 18 in a conventional manner. The internal RAM of the controller 60 stores statuses of operational flags and various control data. The internal ROM of the controller 60 stores the predetermined data values, such as the temperature thresholds, for various operations. It will be apparent to those skilled in the art from this disclosure that the precise structure and algorithms for the controller 60 can be any combination of hardware and software that will carry out the functions of the present invention.

The various elements of the vehicle 10, such as engine control components (not shown) are conventional components that are well known in the art. Since these components are well known in the art, these structures will not be discussed or illustrated in detail herein.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Accordingly, these terms, as utilized to describe the present invention should be interpreted relative to a vehicle equipped with the vehicle engine warm-up apparatus.

The term "detect" as used herein to describe an operation or function carried out by the controller 60, or a component, a section, a device or the like includes a component, a section, a device or the like that does not require physical detection, but rather includes determining, measuring, modeling, predicting or computing or the like to carry out the operation or function whereby one or more parameters measured or sensed by one of the sensors connected to the controller 60 is received and processed accordingly by the controller 60.

The term "configured" is used herein to describe a component, section or part of a device that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle engine warm-up apparatus for a vehicle having a passenger compartment, comprising:
    a vehicle engine located within the vehicle, the vehicle engine having a coolant passage defined therein;
    a heating system having a heater core in fluid communication with the coolant passage of the vehicle engine receiving coolant from the coolant passage of the vehicle engine, the heater core of the heating system being operable to provide heat to the passenger compartment of the vehicle;
    a coolant temperature sensor measuring temperature of the coolant flowing through the coolant passage of the vehicle engine;
    a coolant heater located within the coolant passage and within the vehicle engine and operable to heat the coolant flowing through the coolant passage of the vehicle engine;
    a passenger compartment temperature sensor located within the passenger compartment of the vehicle; and
    a controller operably coupled to the coolant temperature sensor, the coolant heater and the passenger compartment temperature sensor, the controller being configured to operate the coolant heater with the vehicle engine running to increase a rate of heating of the coolant to more rapidly make heat available to the heating system in response to determining that two conditions are met, first that the coolant temperature is below a first temperature threshold, and second that the temperature within the passenger compartment measured by the passenger compartment temperature sensor is below second temperature threshold.

2. The vehicle engine warm-up apparatus according to claim 1, wherein
    the controller is further configured to cease operation of the coolant heater in response to determining the coolant temperature is above the first temperature threshold.

3. The vehicle engine warm-up apparatus according to claim 1, further comprising
    a temperature sensor configured to measure a temperature of ambient air outside the passenger compartment and further in response to determining the air temperature is above a third temperature threshold the controller ceases operation of the coolant heater.

4. The vehicle engine warm-up apparatus according to claim 1, wherein
the controller is further configured to prevent operation of the coolant heater in response to determining that the passenger compartment is above the second temperature threshold.

5. The vehicle engine warm-up apparatus according to claim 1, further comprising
heating system controls connected to the controller and including a thermostatic device operable by a vehicle passenger, the second temperature threshold being set by the thermostatic device in response to operation by the vehicle passenger.

6. The vehicle engine warm-up apparatus according to claim 5, wherein
the controller is further configured to cease operation of the coolant heater in response to determining that the temperature within the passenger compartment measured by the passenger compartment temperature sensor is at or above the second temperature threshold.

7. A vehicle engine warm-up apparatus for a vehicle having a passenger compartment, comprising:
a vehicle engine within the vehicle and having a coolant passage defined therein;
a heating system having a heater core in fluid communication with the coolant passage of the vehicle engine receiving coolant from the coolant passage of the vehicle engine, the heater core of the heating system being operable to provide heat to a passenger compartment of the vehicle;
a coolant temperature sensor measuring temperature of the coolant flowing through the coolant passage of the vehicle engine;
a coolant heater located within the coolant passage and within the vehicle engine and operable to heat the coolant flowing through the coolant passage of the vehicle engine;
a heating system sensor detecting operational states of the heating system, wherein the operational states of the heating system include a heat requested operating state and a no-heat requested operating state, and
a controller operably connected to the coolant temperature sensor, the coolant heater and the heating system sensor, the controller being configured to operate the coolant heater with the vehicle engine running to increase a rate of heating of the coolant to more rapidly make heat available to the heating system in response to determining that two conditions are met, first that the coolant temperature is below a first temperature threshold, and, second that the heating system is in the heat requested operating state.

8. The vehicle engine warm-up apparatus according to claim 7, wherein
the controller is further configured to cease operation of the coolant heater in response to determining that the heating system is in the no-heat requested operating state.

9. The vehicle engine warm-up apparatus according to claim 7, wherein
the heating system sensor is coupled to a heater core door, the door being movable by passenger operated controls to move between a first position corresponding to the heat requested operating state such that the heater core door allows heating of air flowing to the passenger compartment and a second position corresponding to the no-heat requested operating state such that the heater core door prevents heating of air flowing to the passenger compartment.

* * * * *